(12) United States Patent
Connors et al.

(10) Patent No.: US 8,843,404 B2
(45) Date of Patent: Sep. 23, 2014

(54) JOINT PRICING AND REPLENISHMENT OF FRESHNESS INVENTORY

(75) Inventors: Daniel P. Connors, Pleasant Valley, NY (US); Markus R. Ettl, Yorktown Heights, NY (US); David D. Yao, Yorktown Heights, NY (US); Zhengliang Xue, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 13/439,462

(22) Filed: Apr. 4, 2012

(65) Prior Publication Data

US 2013/0268415 A1 Oct. 10, 2013

(51) Int. Cl.
*G06Q 10/00* (2012.01)

(52) U.S. Cl.
USPC ............ 705/28; 235/383; 235/376; 235/375; 235/379; 705/7.25; 705/38; 705/26.8; 705/30; 705/34; 705/7.12; 705/14.72; 705/26.81; 705/26.1; 705/29; 705/14.61; 705/37; 705/26.3; 705/27.2; 705/26.9; 705/22; 705/25; 705/39; 705/21; 705/14.73; 705/7.11; 705/7.14; 705/7.17; 705/7.31; 705/26.7; 705/7.13; 705/14.23; 705/26.4; 705/3; 705/26.2; 705/14.5; 705/14.1

(58) Field of Classification Search
CPC ..... G06Q 10/087; G06Q 10/08; G06Q 10/06; G06Q 30/06; G06Q 30/02; G06Q 30/0202
USPC ......................................................... 705/28
See application file for complete search history.

(56) References Cited

U.S. PATENT DOCUMENTS

| | | | |
|---|---|---|---|
| 2007/0061185 A1 * | 3/2007 | Peters et al. | 705/10 |
| 2008/0294477 A1 * | 11/2008 | Lore et al. | 705/7 |
| 2011/0282821 A1 * | 11/2011 | Levy et al. | 706/47 |

OTHER PUBLICATIONS

Dobbins, Richard; Pettman, Barrie O. Self-development: The nine basic skills for business success. The Journal of Management Development, 1997.*
By L M A Chan, Zuo-Jun Max Shen, David Simchi-Levi, Julie L Swann "Coordination of Pricing and Inventory Decisions: A Survey and Classification" Environmental Engineering (2004) Publisher: Springer, pp. 1-64.
Chen, X., D. Simchi-Levi. "Coordinating inventory control and pricing strategies: the continuous review model" Science Direct, Operations Research Letters, 34(3) 323-332 available online Jun. 27, 2005.
Chen, X., D. Simchi-Levi. "Coordinating inventory control and pricing strategies with random demand and fixed ordering cost: the finite horizon case" Mathematics of Operations Research p. 698 Aug. 2004.

(Continued)

*Primary Examiner* — F. Zeender
*Assistant Examiner* — Fawaad Haider
(74) *Attorney, Agent, or Firm* — Scully, Scott, Murphy & Presser, P.C.; Daniel P. Morris, Esq.

(57) ABSTRACT

Joint pricing and replenishment of freshness inventory or products having different qualities determines the joint pricing and inventory strategies to optimize the retailer's benefits from product freshness, employing a dynamic programming formulation that incorporates a demand model that captures consumer choice based on both the freshness and price.

18 Claims, 2 Drawing Sheets

(56) References Cited

OTHER PUBLICATIONS

Chen, F.Y., S. Ray, Y. Song. 2006 "Optimal pricing and inventory control policy in periodic review systems with fixed ordering cost and lost sales" Wiley Periodicals, published online Dec. 12, 2005 www.interscience.wiley.com.

Chen, H., Wu, O. and Yao, D.D. 2010 "On the Benefit of Inventory-Based Dynamic PricingStrategies" Production and Operations Management, vol. 19, No. 3 pp. 249-260 May-Jun. 2010.

Elmaghraby, W., P. Keskinocak. "Dynamic pricing in the presence of inventory considerations:research overview, current practices and future directions" Management Science, 49 (10) 1287-1309 Oct. 2003.

Federgruen, A., A. Heching. "Combined pricing and inventory control under uncertainty. Operations Research" vol. 47 (3) 454-475 May-Jun. 1999.

Feng, Y., F. Y. Chen. Joint pricing and inventory control with setup costs and demand uncertainty. Working paper, Chinese University of Hong Kong Oct. 30, 2003.

Feng, Y., F.Y. Chen. Optimality and optimization of a joint pricing and inventory-control policy for a periodic-review system. Working paper, Chinese University of Hong Kong, Dec. 9, 2006.

Gayon J.P., Y. Dallery. 2. Dynamic vs static pricing in a make-to-stock queue with partially controlled production. OR Spectrum, vol. 29 No. 2 2006.

Huh, W.T., G. Janakiraman. "Optimality results in inventory-pricing control: an alternate approach" Operations Research, vol. 56, No. 3 pp. 783-790 May-Jun. 2008.

Polatoglu, H., I. Sahin.Optimal procurement policies under price-dependent demand. International Journal of Production Economics, 65(2) 141-171 Apr. 20, 2000.

Porteus (Porteus, E. L. "Investing in reduced setups in the EOQ model" Management Science, vol. 31(8) pp. 998-1010 Aug. 1985.

Rajan, A., Rakesh, R. Steinberg "Dynamic pricing and ordering decisions by a monopolist" Management Science, vol. 38(2) pp. 240-262, Feb. 1992.

Song, Y., S. Ray, T. Boyaci. "Optimal dynamic joint pricing and inventory control for multiplicative demand with fixed order costs" published online before print Aug. 21, 2008 or.journal.informs.org.

Whitin, T.M. "Inventory control and price theory" Management Science, vol. 2, No. 1 pp. 61-68 Oct. 1955.

\* cited by examiner

JOINT PRICING AND REPLENISHMENT OF FRESHNESS INVENTORY

FIELD

The present application relates generally to supply chain network and systems, and more particularly to integrated pricing and replenishment of freshness inventory.

BACKGROUND

Freshness inventory refers to a stocking system of products with a relatively short shelf life such that managing some measure of freshness is a central concern. Freshness inventory differs from perishable inventory in several ways. Perishable inventory has a binary (0-1) utility: zero utility after the expiration date and full utility before. The utility of freshness inventory, in contrast, dynamically decreases to zero over time.

The joint pricing and inventory replenishment model has been studied in the setting of durable goods inventory. The survey papers, Yano and Gilbert (Yano, C. A., S. M. Gilbert. 2003. Coordinated pricing and production/procurement decisions: a review. In: *Managing Business Interfaces: Marketing, Engineering and Manufacturing Perspectives*, A. Chakravarty and J. Eliashberg (eds.), Kluwer Academic Publishers), Elmaghraby and Keskinocak (Elmaghraby, W., P. Keskinocak. 2003. Dynamic pricing in the presence of inventory considerations: research overview, current practices and future directions. *Management Science*, 49 (10) 1287-1309), and Chan et al. (Chan, L. M. A., Z. J. Shen, D. Simchi-Levi, J. L. Swann. 2004 Coordination of pricing and inventory decisions: a survey and classification. In *Supply Chain Analysis in the eBusiness Era*, D. Simchi-Levi, D. Wu and Z. J. Shen (eds), Kluwer Academic Publishers) provide studies of the joint pricing and inventory replenishment model in the setting of durable goods inventory. Whitin (Whitin, T. M. 1955. Inventory control and price theory. *Management Science*, 2(1) 61-68), Porteus (Porteus, E. L. 1985a. Investing in reduced setups in the EOQ model. *Management Science*, 31(8) 998-1010), Rajan, Rakesh and Steinberg (Rajan, A., Rakesh, R. Steinberg. 1992. Dynamic pricing and ordering decisions by a monopolist. *Management Science*, 38(2) 240-262), among others, study demands that are deterministic functions of price. Whitin (Whitin, T. M. 1955. Inventory control and price theory. *Management Science*, 2(1) 61-68) connects pricing and inventory control in the EOQ framework, and Porteus (Porteus, E. L. 1985a. Investing in reduced setups in the EOQ model. *Management Science*, 31(8) 998-1010) provides an explicit solution for the linear demand instance. Rajan, Rakesh and Steinberg (Rajan, A., Rakesh, R. Steinberg. 1992. Dynamic pricing and ordering decisions by a monopolist. *Management Science*, 38(2) 240-262) investigate continuous pricing for perishable products for which demands may diminish as products age.

The body of research on pricing and stochastic inventory control has been focused on establishing the optimality of structural inventory and pricing policies. Federgruen and Heching (Federgruen, A., A. Heching. 1999. Combined pricing and inventory control under uncertainty. *Operations Research*, 47(3) 454-475) examine a periodic-review model in which the demand in each period depends on the price charged in that period and a random term. The dependence can be quite general, but every realization of demand function is assumed to be concave in price. The replenishment cost is linear, without a fixed setup cost. The authors show that a base-stock list-price policy is optimal for both average and discounted objectives. Earlier related works include those by Zabel (Zabel, E. 1972. Multiperiod monopoly under uncertainty. *Journal of Economic Theory*, 5(3) 524-536) and Thowsen (Thowsen, G. T. 1975. A dynamic, nonstationary inventory problem for a price/quantity setting firm. *Navel Research Logistics Quarterly*, 22 461-476).

When including a replenishment setup cost, the relevant policy is the (s, S, p) policy (i.e., inventory control follows the usual (s, S) policy, while the price p depends on the initial inventory level. The optimality of (s, S, p) policy has been established under various settings. Periodic-review backorder setting is considered in Chen and Simchi-Levi (Chen, X., D. Simchi-Levi. 2004a. Coordinating inventory control and pricing strategies with random demand and fixed ordering cost: the finite horizon case. *Operations Research*, 52(6) 887-896 and Chen, X., D. Simchi-Levi. 2004b. Coordinating inventory control and pricing strategies with random demand and fixed ordering cost: the infinite horizon case. *Mathematics of Operations Research*, 29(3) 698-723), Feng and Chen (Feng, Y., F. Y. Chen. 2004. Optimality and optimization of a joint pricing and inventory-control policy for a periodic-review system. Working paper, Chinese University of Hong Kong). Periodic-review lost sales setting is considered in Polatoglu and Sahin (Polatoglu, H., I. Sahin. 2000. Optimal procurement policies under price-dependent demand. *International Journal of Production Economics*, 65(2) 141-171), Chen, Ray and Song (Chen, F. Y., S. Ray, Y. Song. 2006. Optimal pricing and inventory control policy in periodic review systems with fixed ordering cost and lost sales. *Naval Research Logistics*, 53(2) 117-136). Huh and Janakiraman (Huh, W. T., G. Janakiraman. 2005. Optimality results in inventory-pricing control: an alternate approach. Working paper, Columbia University, New York University) provide an approach for proving and generalizing many of the early results for both backorder and lost sales settings. Continuous-review models are studied by Feng and Chen (Feng, Y., F. Y. Chen. 2003. Joint pricing and inventory control with setup costs and demand uncertainty. Working paper, Chinese University of Hong Kong), and Chen and Simchi-Levi (Chen, X., D. Simchi-Levi. 2006. Coordinating inventory control and pricing strategies: the continuous review model. *Operations Research Letters*, 34(3) 323-332).

One of the key determinants of the complexity and generality of these models is the assumption about the demand. The demand function in each period typically consists of a deterministic demand function and a random component. These two components can be additive (e.g., Chen, X., D. Simchi-Levi. 2004a. Coordinating inventory control and pricing strategies with random demand and fixed ordering cost: the finite horizon case. *Operations Research*, 52(6) 887-896 and Chen, F. Y., S. Ray, Y. Song. 2006. Optimal pricing and inventory control policy in periodic review systems with fixed ordering cost and lost sales. *Naval Research Logistics*, 53(2) 117-136), or multiplicative (e.g., Song, Y., S. Ray, T. Boyaci. 2006. Optimal dynamic joint pricing and inventory control for multiplicative demand with fixed order costs. Working paper, McGill University), or both (e.g., Zabel, E. 1972. Multiperiod monopoly under uncertainty. *Journal of Economic Theory*, 5(3) 524-536, Chen, X., D. Simchi-Levi. 2004a. Coordinating inventory control and pricing strategies with random demand and fixed ordering cost: the finite horizon case. *Operations Research*, 52(6) 887-896 and Chen, X., D. Simchi-Levi. 2004b. Coordinating inventory control and pricing strategies with random demand and fixed ordering cost: the infinite horizon case. *Mathematics of Operations Research*, 29(3) 698-723). Some other models allow the random component to affect the demand in more general forms (e.g., Federgruen, A., A. Heching. 1999. Combined pricing and inventory control under uncertainty. *Operations Research*, 47(3) 454-475, Polatoglu, H., I. Sahin. 2000. Optimal procurement policies under price-dependent demand. *International Journal of Production Economics*, 65(2) 141-171, Feng, Y., F. Y. Chen. 2004. Optimality and optimization of a joint pricing and inventory-control policy for a periodic-review system. Working paper, Chinese University of Hong Kong, and Huh, W. T., G. Janakiraman. 2005. Optimality results in inventory-pricing control: an alternate approach. Working paper, Columbia University, New York University). In Chen, Wu and Yao (Chen, H., Wu, O. and Yao, D. D. 2010. On the Benefit of Inventory-Based Dynamic Pricing Strategies. *Production and Operations Management*, 19, 249-260), the demand model is Brownian motion with the drift and diffusion coefficients both depending on the price set by the firm. This price dependence is general enough to include the continuous-time analogy of additive demand and multiplicative demand as special cases. Furthermore, the diffusion coefficient brings out explicitly the impact of demand variability on various performance measures.

Another issue of interest is to quantify the profit improvement of using dynamic pricing over static pricing. Results along this line were mostly limited to numerical studies. Federgruen and Heching (Federgruen, A., A. Heching. 1999. Combined pricing and inventory control under uncertainty. *Operations Research*, 47(3) 454-475) experimented with a multiplicative demand case in a periodic-review system, and found that the benefit of dynamic pricing increases as demand variability increases. They reported a maximum of 6.54% increase in profit compared to a fixed pricing strategy. With a order-setup cost, Feng and Chen (Feng, Y., F. Y. Chen. 2004. Optimality and optimization of a joint pricing and inventory-controlpolicy for a periodic-review system. Working paper, Chinese University of Hong Kong) show that the profit improvement of dynamic pricing is limited (the profit improvement as a percentage of static pricing profit could be large when the static pricing profit is low.) For a periodic-review system with additive demand and lost sales, Chen, Ray and Song (Chen, F. Y., S. Ray, Y. Song. 2006. Optimal pricing and inventory control policy in periodic review systems with fixed ordering cost and lost sales. *Naval Research Logistics*, 53(2) 117-136) find that the profit improvement of dynamic pricing increases in the fixed ordering cost. They reported a maximum of 3.74% improvement in profit. Most of the above results exhibit rather modest benefits of dynamic pricing with respect to static pricing (when the demand is stationary). Gayon and Dallery (Gayon J. P.,Y. Dallery. 2006. Dynamic vs static pricing in a make-to-stock queue with partially controlled production. OR Spectrum, forthcoming) point out that dynamic pricing is potentially much more beneficial when the replenishment process is partially controlled. Chen, Wu and Yao (Chen, H., Wu, O. and Yao, D. D. 2010. On the Benefit of Inventory-Based Dynamic Pricing Strategies. *Production and Operations Management*, 19, 249-260) develop an upper-bound to quantify the profit improvement using dynamic pricing and to identify situations where the improvement can be significant.

BRIEF SUMMARY

A method for joint pricing and replenishment of freshness inventory, in one aspect, may include receiving sales data including sales price and quantities sold associated with a given product. The method may also include determining product qualities and customer's sensitivities to the product qualities for a plurality of customer classes based on the received sales data. The method may further include, for each of a plurality of selling scenarios: determining maximum retailer price associated with each of the product qualities; determining order-up-to levels for the plurality of product qualities based on the determined maximum retailer price associated with each of the product qualities and an objective function; and computing a profit based on the determined order-up-to levels and the objective function. The method may further include selecting a profitable selling scenario from the plurality of selling scenarios based on the computed profit associated with said each of the plurality of selling scenarios. The method may still further include identifying prices and order-up-to levels associated with the selected profitable selling scenario.

A method for joint pricing and replenishment of freshness inventory, in another aspect, may include receiving sales data including sales price and quantities sold associated with a given product. The method may further include determining product qualities and customer's sensitivities to the product qualities for a plurality of customer classes based on the received sales data. The method may also include determining maximum cross-selling retailer price associated with each of the product qualities for a cross-selling scenario. The method may yet also include determining cross-selling order-up-to levels for the plurality of product qualities based on the determined maximum cross-selling retailer price associated with each of the product qualities and a first objective function. The method may still further include computing cross-selling profit based on the determined cross-selling order-up-to levels based on the first objective function. The method may also include determining maximum down-selling retailer price associated with each of the product qualities for a down-selling scenario. The method may further include determining down-selling order-up-to levels for the plurality of product qualities based on the determined maximum down-selling retailer price associated with each of the product qualities and a second objective function. The method may yet further include computing cross-selling profit based on the determined down-selling order-up-to levels based on the second objective function. The method may also include determining maximum up-selling retailer price associated with each of the product qualities for an up-selling scenario. The method may further include determining up-selling order-up-to levels for the plurality of product qualities based on the determined maximum up-selling retailer price associated with each of the product qualities and a third objective function. The method may also include computing up-selling profit based on the determined up-selling order-up-to levels based on the third objective function. The method may further include selecting a profitable scenario from the cross-selling scenario, the down-selling scenario and the up-selling scenario, based on the computed cross-selling profit, the down-selling profit, and the up-selling profit. The method may also include outputting prices and order-up-to levels associated with the selected profitable scenario.

A system for joint pricing and replenishment of freshness inventory, in one aspect, may include a module operable to execute on the processor. The module may be operable to receive sales data including sales price and quantities sold associated with a given product. The module may be further operable to determine product qualities and customer's sensitivities to the product qualities for a plurality of customer classes based on the received sales data.

The module may be further operable to determine maximum cross-selling retailer price associated with each of the product qualities for a cross-selling scenario. The module may be also operable to determine cross-selling order-up-to levels for the plurality of product qualities based on the determined maximum cross-selling retailer price associated with each of the product qualities and a first objective function. The module may be further operable to compute cross-selling profit based on the determined cross-selling order-up-to levels based on the first objective function.

Yet further, the module may be also operable to determine maximum down-selling retailer price associated with each of the product qualities for a down-selling scenario. The module may be further operable to determine down-selling order-up-to levels for the plurality of product qualities based on the determined maximum down-selling retailer price associated with each of the product qualities and a second objective function. The module may be further operable to compute cross-selling profit based on the determined down-selling order-up-to levels based on the second objective function.

Still yet, the module may be also operable to determine maximum up-selling retailer price associated with each of the product qualities for an up-selling scenario. The module may be further operable to determine up-selling order-up-to levels for the plurality of product qualities based on the determined maximum up-selling retailer price associated with each of the product qualities and a third objective function. The module may be further operable to compute up-selling profit based on the determined up-selling order-up-to levels based on the third objective function.

Still further, the module may be operable to select a profitable scenario from the cross-selling scenario, the down-selling scenario and the up-selling scenario, based on the computed cross-selling profit, the down-selling profit, and the up-selling profit. The module may be also operable to output prices and order-up-to levels associated with the selected profitable scenario.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
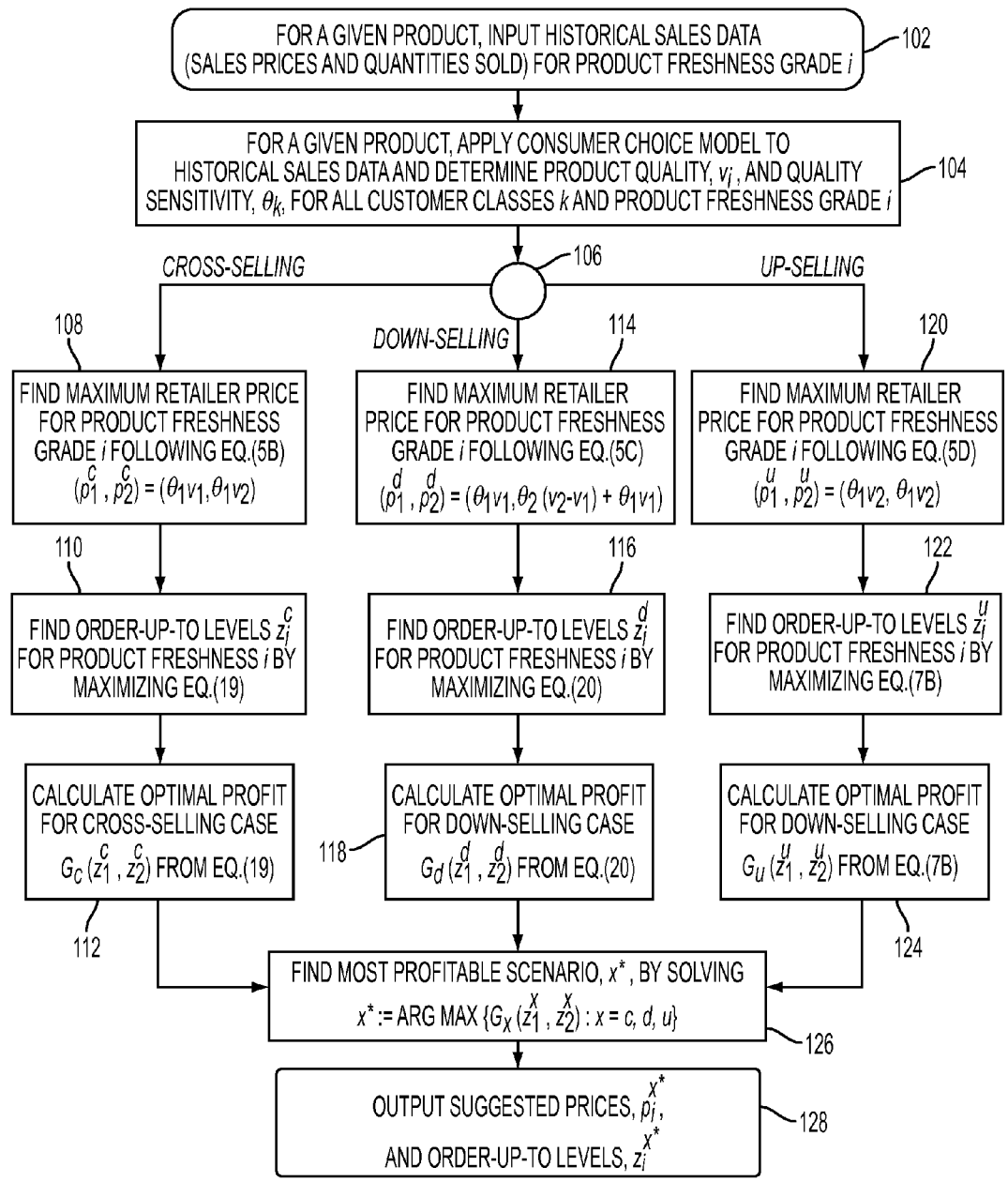
FIG. 1 is a flow diagram illustrating a method for determining joint pricing and replenishment of freshness inventory in one embodiment of the present disclosure.

Freshness inventory refers to a stocking system of products with a relatively short shelf life, for controlling and managing a measure of freshness. A retailer may sell both fresh and aged products where the fresher product provides a higher quality to customers, and customers might upgrade or downgrade their preferred product choice if a stock-out takes place. In addition, demand can be controlled by pricing strategies. The present disclosure in one embodiment describes differential pricing strategy contingent on product freshness, and also determining joint pricing and inventory strategy corresponding to the customer demand, for instance, based on consumer choice model, which captures freshness and price sensitive demand. A joint pricing and inventory decisions provided in the present disclosure may maximize the retailer's expected profit under uncertain demand. In one aspect, an easy-to-use, responsive, and accurate tool may be developed that helps set pricing and inventory decisions for the retailers who manage the product freshness, and may provide a fast, near-optimal solutions to ensure daily response to large amount of products. Further, analytics may be performed based on the age distribution of inventory.

Thus, in one embodiment of the present disclosure, methodologies and systems may be provided for joint pricing and replenishment of freshness inventory that may compute the joint pricing and inventory strategies to optimize the retail's profitability from product freshness considering a demand model that captures consumer choice based on both the freshness and price. The retailers may benefit from price differentiation based on the degree of freshness. In another aspect, the methodologies and systems of the present disclosure may employ the knowledge of the age distribution of inventory to determine the optimal pricing strategy, and integrate it with the ordering and depletion decisions. Ordering and depletion methodologies are also described in U.S. patent application Ser. No. 13/093,359 entitled, "Managing Fresh-Product Inventory", filed on Apr. 29, 2011, which application is incorporated herein in its entirety.

Consider a retailer offering differentiated prices based on the degree of product freshness. There are two degrees of freshness: indexed by $i \in \{1,2\}$, according to the remaining shelf life equal to i periods. Retailer offers a discount for the aged product. Such differentiated pricing strategy may be determined at the beginning of the planning horizon. Each planning horizon may include T periods. The retailer reviews the inventory and makes the inventory decision at the beginning of each period, depleting some or all of the aged units and ordering more fresh units.

The retailer's pricing strategy interacts with consumers' purchase decision. Assume there are two segments of customers, indexed by $k \in \{1,2\}$, in which the customer of type 2 is the high end whose quality sensitivity is higher. Each customer has three possible options: non-purchase option (0), aged product (1), and fresh product (2). Customer behavior can be expressed by $B = \{\pm, S\}$, where $S = \{0,1,2\}$ is the set of all options, and $\pm$ is the preference relation. For example, $\{1 \pm 2 \pm 0\}$ means the customer prefers the aged product to fresh one, however, the customer would like to buy the fresh product if the aged product is out of stock.

The retailer's pricing strategy may determine customers' purchase behavior. On the other hand, customers' choice may affect the retailer's inventory decision. In the present disclosure in one embodiment, the interplay of retailer and customers is analyzed by a Stackelberg game, which is streamlined by the following sequence of events: (1) Retailer offers differentiated price $\vec{p} = (p_1, p_2)$ at the beginning of period 1; (2) Customers observe the price and decide their own purchase behavior; (3) Retailer periodically reviews the inventory, depleting the aged product and ordering the fresh one.

To analyze the customer behavior in the presence of different degrees of product freshness, the methodology of the present disclosure in one embodiment may employ a quality sensitivity model to study the consumer choice. Then a random demand model may be developed or established based on the discrete choice model.

Consumer Choice Model

One embodiment of the methodology is based on establishing two customer types, indexed by $k = 1, 2$. For each k, the utility is a linear function of the form $\theta_k v - p$, where p denotes the price of the product; v, the quality (or, specifically, a measure of freshness) of the product; and θ, a parameter that reflects the customer's sensitivity to the product quality.

For each product i, i=1, 2, suppose the price is $p_i$ and the quality is $v_i$. As specified earlier, product 1 is the aged one, with one period of remaining shelf life; whereas product 2 is the fresh one, with two periods of remaining shelf life. Assume $$0 \le p_1 \le p_2, 0 \le v_1 \le v_2. \tag{1}$$

Also, assume the following incentive compatibility (IC) constraints hold.

$$\theta_1 v_1 - p_1 \ge \theta_1 v_2 - p_2, \theta_2 v_2 - p_2 \ge \theta_2 v_1 - p_1. \tag{2}$$

The two inequalities mean that type 1 customers prefer type 1 product and type 2 customers prefer type 2 product. Note the above, along with (1) implies:

$$\theta_1(v_2 - v_1) \le p_2 - p_1 \le \theta_2(v_2 - v_1). \tag{3}$$

Furthermore, assume the disutility of non-purchase is equal to 0. Then, customer of type i prefers purchase to non-purchase if $\theta_i v - p \ge 0$, for i=1, 2.

In a stockout substitution, i.e., customer's preferred product quality is out of stock, and another product quality that is in stock is substituted, there may be three possible scenarios. First scenario in the present disclosure is referred to as cross-selling—customers of either type, upon the stockout of their preferred product, will buy the other product type. For this to happen, the following is satisfied:

$$\theta_2 v_2 - p_2 \ge \theta_2 v_1 - p_1, \theta_1 v_1 - p_1 \ge \theta_1 v_2 - p_2 \ge 0. \tag{3a}$$

Note the first and the third inequalities are the incentive compatibility constraints in (2); the second inequality is due to $\theta_2 \ge \theta_1$; and the last inequality indicates that for type 1 customers, buying type 2 product is better than the non-purchase option. Therefore, in the cross-selling scenario, the constraint set for the prices is:

$$P_c = \{(p_1, p_2) | \theta_1(v_2 - v_1) \le p_2 - p_1 \le \theta_2(v_2 - v_1), p_1 \le \theta_1 v_1, p_2 \le \theta_1 v_2\}. \tag{4}$$

The second scenario is down-selling: the high-end, type-2 customers are willing to buy the aged product 1 if the fresh product is out of stock. On the other hand, type-1 customer will simply walk away if product 1 is out of stock, i.e., the corresponding utility to buy a type 2 product is negative—lower than the non-purchase option. For this to happen, the prices should satisfy the following constrains:

$$\theta_2 v_2 - p_2 \ge \theta_2 v_1 - p_1 > \theta_1 v_1 - p_1 \ge 0 > \theta_1 v_2 - p_2. \tag{4a}$$

Hence, in the down-selling scenario, the constraint set for the prices is:

$$P_d = \{(p_1, p_2) | \theta_1(v_2 - v_1) \le p_2 - p_1 \le \theta_2(v_2 - v_1), p_1 \le \theta_1 v_1, p_2 > \theta_1 v_2\}. \tag{5}$$

Next, consider the up-selling scenario, in which the low-end (type-1) customers will upgrade to the fresh product when the aged one is out of stock; however, the high-end (type-2) customers will not buy the aged product when the fresh one is out of stock. For this to happen the prices need to satisfy:

$$\theta_2 v_2 - p_2 \ge 0 > \theta_2 v_1 - p_1, \theta_1 v_1 - p_1 \ge \theta_1 v_2 - p_2 \ge 0. \tag{5a}$$

The above will lead to a contradiction:

$$\theta_2 v_1 - p_1 < 0 \le \theta_1 v_1 - p_1,$$

meaning $\theta_2 < \theta_1$. Therefore, in this embodiment, up-selling can only happen if the inventory of the aged product is zero. Detailed description is given with reference to Eq. (7) below.

From the constraint sets $P_c$ and $P_d$ above, the best (maximal) prices may be derived that the retailer can charge, as summarized below.

In one embodiment of the present disclosure, the following proposition may be considered:

Proposition 1: In the cross-selling and the down-selling scenarios, the highest prices the retailer can charge are the maximal values in $P_c$ and $P_d$, respectively:

$$(p_1^c, p_2^c) = (\theta_1 v_1, \theta_1 v_2) \tag{5b}$$

and $$(p_1^d, p_2^d) = (\theta_1 v_1, \theta_2(v_2 - v_1) + \theta_1 v_1). \tag{5c}$$

and $$(p_1^u, p_2^u) = (\theta_1 v_2, \theta_1 v_2). \tag{5d}$$

Note, while $p_1^c = p_1^d$, we have $p_2^c \le p_2^d$.

Optimal Replenishment Quantities

In the present disclosure in one embodiment, products are group into two products, indexed by subscripts i=1, 2; product 1 is aged, product 2 is fresh. Let $p_i$ and $c_i$ denote the unit selling price and purchasing cost, respectively. At the end of the period, any remaining product 2 can be salvaged at $c_1$ per unit, any remaining product 1 will have to be discarded. Let $D_i$ denote the demand for the two products over the period. A demand will be supplied by the product of the same type if the latter is in stock. When a stock-out happens, whether or not the demand will be supplied by the other type of product depends on the retailer's pricing strategy, which, as specified in Proposition 1, results in one of two cases: either cross-selling or down-selling. Any unmet demand will be lost (without penalty).

The objective function for the cross-selling case can be formulated as follows:

$$G_c(z_1, z_2) := \sum_{i=1}^{2} [p_i^c E(z_i \wedge D_i) - c_i z_i] + p_1^c E[(D_2 - z_2)^+ \wedge (z_1 - D_1)^+] + p_2^c E[(D_1 - z_1)^+ \wedge (z_2 - D_2)^+] + c_1 E[(z_2 - D_2)^+ - (D_1 - z_1)^+]^+. \tag{6}$$

where, $G_c$ represents an objective function for cross-selling;
$z_1$ represents order quantity of product type 1;
$z_2$ represents order quantity of product type 2;
$z_i$ represents order quantity of product type i;
$p_i^c$ represents price of product type i in cross-selling scenario;
$p_1^c$ represents price of product type 1 in cross-selling scenario;
$p_2^c$ represents price of product type 2 in cross-selling scenario;
E represents expected value.

The first term (summation) above is the revenue minus cost from the two products, the second and third terms are revenues from cross-selling the two products when the other product is out of stock, and the last term is the salvage value from any leftover type-2 products at the end of the period.

The decision, to be made at the beginning of the period, is to determine the order quantities of the two types of products, denoted $(z_1, z_2)$. The optimization problem, for the cross-selling case is:

$$\max_{z_1, z_2 \geq 0} G_c(z_1, z_2) \quad (6a)$$

The down-selling case is similar. The objective function can be formulated as:

$$G_d(z_1, z_2) := \sum_{i=1}^{2} [p_i^d E(z_i \wedge D_i) - c_i z_i] + p_1^d E[(D_2 - z_2)^+ \wedge (z_1 - D_1)^+] + c_1 E(z_2 - D_2)^+. \quad (7)$$

where,
$G_d$ represents an objective function for down-selling;
$z_1$ represents order quantity of product type 1;
$z_2$ represents order quantity of product type 2;
$z_i$ represents order quantity of product type i;
$p_i^d$ represents price of product type i in down-selling scenario;
$p_1^d$ represents price of product type 1 in down-selling scenario;
$p_2^d$ represents price of product type 2 in down-selling scenario;
E represents expected value.

The first term (summation) is the revenue minus cost from the two products, the second and third terms are revenues from down-selling to the aged product (type-1) when the fresh product (type-2) is out of stock, and the last term is the salvage value from any leftover type-2 products at the end of the period.

The optimization problem, for the down-selling case is:

$$\max_{z_1, z_2 \geq 0} G_d(z_1, z_2) \quad (7a)$$

The objective function for the up-selling case can be formulated as follows:

$$G_u(0, z_2) := [p_2^u E(z_2 \wedge (D_1 + D_2)) - c_2 z_2] + c_1 E[z_2 - (D_1 + D_2)]^+. \quad (7b)$$

where,
$G_u$ represents an objective function for up-selling;
$p_2^u$ represents price of product type 2 in up-selling scenario. Other terms used in Eq. (7b) are explained above with reference to Eq. (6) and Eq. (7).

The first term above is the revenue minus cost from the fresh products, and the second term is the salvage value from any leftover type-2 products at the end of the period.

The decision, to be made at the beginning of the period, is to determine the order quantities of the fresh products, denoted $z_2$. In one embodiment of the present disclosure, aged product is not provided, so that leaves the low end customer with upgrading their purchase.

The optimization problem, for the up-selling case is:

$$\max_{z_2 \geq 0} G_u(0, z_2) \quad (7c)$$

In order to derive the optimal solution for the optimization problems (6a) and (7a), we next examine the first-order condition of the objective functions $G_c(z_1, z_2)$ and $G_d(z_1, z_2)$. Instead of z, the methodology of the present disclosure switches to generic x in this part. Write $$(D_1 - x_1)^+ \wedge (x_2 - D_2)^+ = (x_2 - D_2)^+ - [(x_2 - D_2)^+ - (D_1 - x_1)^+]^+$$
$$= (x_2 - D_2)^+ - [x_2 - D_2 - (D_1 - x_1)^+]^+$$

Note the following:

$$[x_2 - D_2 - (D_1 - x_1)^+]^+ = \max\{x_1 + x_2 - D_1 - D_2, x_1 - D_1, 0\} - \max\{x_1 - D_1, 0\}. \quad (8)$$

To verify the above equality, consider two cases: (i) $D_2 \geq x_2$, and (ii) $D_2 < x_2$. In the second case, further breakdown to $x_1 \geq D_1$, and $x_1 < D_1$. Denote $$M_i(x_1, x_2) := \max\{x_1 + x_2 - D_1 - D_2, x_i - D_i, 0\}, \; m_i(x_i) := (x_i - D_i)^+; \; i = 1, 2. \quad (9)$$

where,
$M_i$ represents the left over inventory of product i (indexed by freshness or quality) after stock-out substitution;
$m_i$ represents the left over inventory of product i (indexed by freshness or quality) before stock-out substitution.

For product 1, the direct and indirect (i.e., substitute for product 2) supply quantities are $$x_1 \wedge D_1 = x_1 - m_1, \text{ and } (D_1 - x_1)^+ \wedge (x_2 - D_2)^+ = m_1 + m_2 - M_1.$$

By symmetry, for product 2, the breakdown is $$x_2 \wedge D_2 = x_2 - m_2, \text{ and } (D_2 - x_2)^+ \wedge (x_1 - D_1)^+ = m_1 + m_2 - M_2.$$

Since the total inventory is $x_1 + x_2$, we have $$(x_1 - m_1) + (m_1 + m_2 - M_1) + (x_2 - m_2) + (m_1 + m_2 - M_2) = x_1 + x_2 + m_1 + m_2 - M_1 - M_2 \leq x_1 + x_2,$$

or, $m_1 + m_2 \leq M_1 + M_2$ which certainly holds, following (9).

Note that for both i=1, 2 $m_i(x_i)$ is convex, and $M_i(x_1, x_2)$ is (jointly) convex, since max is convex. Furthermore, $M_i(x_1, x_2)$ is supermodular in $(x_1, x_2)$, since it takes the form of $g(x_1 + x_2)$ where g is the max operator which is a convex function.

Putting together the above, we can write:

$$(D_1 - x_1)^+ \wedge (x_2 - D_2)^+ = m_1(x_1) + m_2(x_2) - M_1(x_1, x_2), \quad (10)$$

$$(D_2 - x_2)^+ \wedge (x_1 - D_1)^+ = m_1(x_1) + m_2(x_2) - M_2(x_1, x_2), \quad (11)$$

Next, consider the derivatives. We have:

$$\frac{d}{dx} E(x - D)^+ = E\left[\frac{d}{dx}(x - D)^+\right] = E[1(x \geq D)] = P(D \leq x). \quad (12)$$

Note the exchange of expectation and derivative above is justified by the Lipschitz continuity of the function $(x - D)^+$. Hence, we have:

$$\frac{d}{dx_i} E[m_i(x_i)] = P(D_i \leq x_i), \; i = 1, 2. \quad (13)$$

The methodology of the present disclosure may apply the same procedure to the (partial) derivative of $M_1$ (with respect to) w.r.t. $x_1$. Observe that the probability in question concerns the event that either $x_1 + x_2 - D_1 - D_2$ or $x_1 - D_1$ (the two terms in $M_1$ that involve $x_1$) attains the max that defines $M_1$. There are two possibilities: (i) if $D_2 > x_2$, then $x_1 - D_1$ will attain the max (provided it is non-negative); (ii) if $D_2 \leq x_2$, then $x_1 + x_2 - D_1 - D_2$ will attain the max (again, provided it is non-negative). Hence, we have $$\frac{\partial}{\partial x_1} E(M_1) = P(D_1 \le x_1, D_2 > x_2) + P(D_2 \le x_2, D_1 + D_2 \le x_1 + x_2) \quad (14)$$
$$= P(D_1 \le x_1) + P(D_1 > x_1, D_1 + D_2 \le x_1 + x_2)$$
$$:= F_1(x_1) + \Psi_1(x_1 + x_2);$$

where $F_1$ denotes the marginal distribution function of $D_1$, and $$\Psi_1(x_1, x_2) := P(D_1 > x_1, D_1 + D_2 \le x_1 + x_2).$$

$\Psi$ is the joint probability that the demand for product type 1, $D_1$, exceeds $x_1$, and the combined demand for product type 1 and 2, $D_1+D_2$, is less than or equal $x_1+x_2$.
Similarly, $$\frac{\partial}{\partial x_2} E(M_1) = P(D_1 \le x_1, D_2 \le x_2) + P(D_1 > x_1, D_1 + D_2 \le x_1 + x_2) \quad (15)$$
$$:= F(x_1, x_2) + \Psi_1(x_1, x_2);$$

where $F(x_1,x_2)$ is the joint distribution function of $(D_1,D_2)$.

Analogously, for the partial derivatives of $M_2$, the following can be derived:

$$\frac{\partial}{\partial x_2} E(M_2) = P(D_2 \le x_2) + P(D_2 > x_2, D_1 + D_2 \le x_1 + x_2) \quad (16)$$
$$:= F_2(x_2) + \Psi_2(x_1, x_2);$$

and $$\frac{\partial}{\partial x_1} E(M_2) = P(D_1 \le x_1, D_2 \le x_2) + P(D_2 > x_2, D_1 + D_2 \le x_1 + x_2) \quad (17)$$
$$:= F(x_1, x_2) + \Psi_2(x_1, x_2);$$

with $F_2$ denoting the marginal distribution function of $D_2$, and $$\Psi_2(x_1, x_2) := P(D_2 > x_2, D_1 + D_2 \le x_1 + x_2).$$

Recall, from Proposition 1, under both cross-selling and down-selling schemes, the optimal price for product 1 is the same, $p_1^c = p_1^d = \theta_1 v_1$; whereas the price for product 2 is different:

$$p_2^c = \theta_1 v_2, \quad p_2^d = \theta_2(v_2 - v_1) + \theta_1 v_1. \quad (18)$$

Note, there is $p_2^d \ge p_2^c$, since $\theta_2 \ge \theta_1$ and $v_2 \ge v_1$. Below, $p_1$ is written for simplicity instead of $p_1^c$ and $p_2^d$.

Using the expressions described above, the objective function in (6) may be written as follows, with $\overline{m}_i := E(m_i)$ and $\overline{M}_i := E(M_i)$ for $i=1, 2$:

$$G_c(z_1, z_2) := p_1(z_1 - \overline{m}_1) - c_1 z_1 + p_2^c(z_2 - \overline{m}_2) - c_2 z_2 + \quad (19)$$
$$p_1(\overline{m}_1 + \overline{m}_2 - \overline{M}_2) + (p_2^c - c_1)(\overline{m}_2 + \overline{m}_1 - \overline{M}_1) +$$
$$c_1 \overline{m}_2$$
$$= (p_1 - c_1) z_1 + (p_2^c - c_2) z_2 + p_1(\overline{m}_2 - \overline{M}_2) +$$
$$(p_2^c - c_1)(\overline{m}_1 - \overline{M}_1).$$

Recall from above, $\overline{m}_i := E(m_i)$ represents expected left over inventory for product $i$; $\overline{M}_i := E(M_i)$ represent expected total left over inventory (for both aged and fresh).

Maximizing the above objective function (19) with respect to $z_i$ solves for the inventory values (order-up-to levels) $z_i^c$ that maximize the expected profit over a single time period for the cross-selling scenario. The formulation can be extended to multiple time periods using standard dynamic programming techniques.

Similarly, the down-selling objective function in (7) may be rewritten as follows. The difference is without the term, in (19), with $(p_2^c - c_1)$ as coefficient after the first equality, and with $p_2^c$ changed to $p_2^d$:

$$G_d(z_1, z_2) := p_1(z_1 - \overline{m}_1) - c_1 z_1 + p_2^d(z_2 - \overline{m}_2) - c_2 z_2 + \quad (20)$$
$$p_1(\overline{m}_1 + \overline{m}_2 - \overline{M}_2) + c_1 \overline{m}_2$$
$$= (p_1 - c_1) z_1 + (p_2^d - c_2) z_2 +$$
$$p_1(\overline{m}_2 - \overline{M}_2) - (p_2^d - c_1) \overline{m}_2.$$

The objective functions shown in (19) and (20) incorporate the demand model parameters $v_i$ and $\theta_k$ that were determined by the consumer choice model through the optimized price values $p_1$, $p_2^c$ and $p_2^d$.

Maximizing the above objective function (20) with respect to $z_i$ solves for the inventory values (order-up-to levels) $z_i^d$ that maximize the expected profit over a single time period for the down-selling scenario. The formulation can be extended to multiple time periods using standard dynamic programming techniques.

As described above, it is known both $G_c$ and $G_d$ are submodular in $(z_1, z_2)$, since $\overline{M}_1$ and $\overline{M}_2$ are both supermodular, and their coefficients in the above expressions are negative. (The other terms are separable in $z_1$ and $z_2$.)

For concavity, the methodology of the present disclosure in one embodiment may start with $G_d$. From (20), concavity w.r.t. $z_1$ is observed ($\overline{M}_1$ is convex in $z_1$ and $z_2$); for concavity w.r.t. $z_2$, note that $\overline{m}_2$ is convex in $z_2$; and it's coefficient is $-(p_2^d - p_1 - c_1)$.

We have

Proposition 2. The objective function in the down-selling case, $G_d(z_1, z_2)$ in (20), is concave in $z_1$, and submodular in $(z_1, z_2)$. With the additional condition, $p_2^d \ge p_1 + c_1$, $G_d$ is also concave in $z_2$.

For references below, the methodology of the present disclosure in one embodiment also may derive the partial derivatives of $G_d$. Making use of the expressions described above, and omitting the arguments, there is $$\partial_1 G_d := \frac{\partial G_d}{\partial z_1} = p_1 - c_1 - p_1(F + \Psi_2), \quad (21)$$

and $$\partial_2 G_d := \frac{\partial G_c}{\partial z_2} = p_2^d - c_2 - p_1 \Psi_2 - (p_2^d - c_1) F_2. \quad (22)$$

Next, examine the concavity of $G_c$ in (19). The two partial derivatives can be derived as follows:

$$\partial_1 G_c := \frac{\partial G_c}{\partial z_1} = p_1 - c_1 - p_1(F + \Psi_2) - (p_2^c - c_1) \Psi_1, \quad (23)$$

and $$\partial_2 G_c := \frac{\partial G_c}{\partial z_2} = p_2^c - c_2 - p_1 \Psi_2 - (p_2^c - c_1)(F + \Psi_1). \quad (24)$$

Observe that per definition, we have $$\Psi_1 + \Psi_2 + F = P(D_1 + D_2 \le z_1 + z_2) := F_+. \quad (25)$$

Hence, (23) may be rewritten as follows:

$$\partial_1 G_c = p_1 - c_1 - (p_2^c - c_1)F_+ + (p_2^c - c_1 - p_1)(F + \Psi_2). \quad (26)$$

Since both $F_+ = P(D_1 + D_2 \leq z_1 + z_2)$ and $F + \Psi_2 = P(D_1 \leq z_1, D_1 + D_2 \leq z_1 + z_2)$ are increasing in $z_1$, the RHS of (27) is decreasing in $z_1$, if $p_2^c - c_1 - p_1 \leq 0$. Similarly, (24) may be rewritten as:

$$\partial_2 G_c = p_2^c - c_2 - p_1 F_+ + (p_2^c - c_1 - p_1)(F + \Psi_1), \quad (27)$$

which is decreasing in $z_2$, if $p_2^c - c_1 - p_1 \geq 0$, reversing the inequality above.

Proposition 3. The objective function in the cross-selling case, $G_c(z_1, z_2)$, is submodular in $(z_1, z_2)$. It is concave in $z_1$ if $p_2^c \leq c_1 + p_1$; it is concave in $z_2$ if $p_2^c \geq c_1 + p_1$.

In view of (18), in particular $p_2^d \geq p_2^c$, we know the condition in Proposition 3 that guarantees the concavity of $G_c$ in $z_2$, $p_2^c \geq c_1 + p_1$, is stronger than $p_2^d \geq c_1 + p_1$, which guarantees the concavity of $G_d$ in $z_2$. Explicitly, it takes the following form:

$$\theta_1(v_2 - v_1) \geq c_1, \quad (28)$$

under which both $G_d$ and $G_c$ are concave in $z_2$. On the other hand, the other condition in Proposition 3, $p_2^c \leq c_1 + p_1$, along with $p_2^d \geq c_1 + p_1$, leads to the following:

$$\theta_2(v_2 - v_1) \geq c_1 \geq \theta_1(v_2 - v_1), \quad (29)$$

under which $G_d$ is in $z_2$ and $G_c$ is concave in $z_1$. For the inequalities in (28, 29) to hold simultaneously, we need $$\theta_2(v_2 - v_1) \geq c_1 = \theta_1(v_2 - v_1), \quad (30)$$

under which both $G_d$ and $G_c$ are concave in $z_1$ and in $z_2$. Note the equality above is equivalent to $p_2^c = c_1 + p_1$.

Finally, consider the boundary cases. When $z_2 = 0$, we have $\Psi_1 = 0$ and $F + \Psi_2 = P(D_1 + D_2 \leq z_1) = F_+$. Hence, from (23), we have $$\partial_1 G_c(z_1, 0) = p_1 - c_1 - p_1 F_+(z_1) = 0 \Rightarrow F_+(z_1) = \frac{p_1 - c_1}{p_1}. \quad (31)$$

Similarly, when $z_1 = 0$, we have $\Psi_2 = 0$ and $F + \Psi_1 = F_+$; hence, from (24), we have $$\partial_2 G_c(0, z_2) = p_2^c - c_2 - (p_2^c - c_1)F_+(z_2) = 0 \Rightarrow F_+(z_2) = \frac{p_2^c - c_2}{p_2^c - c_1}. \quad (32)$$

Note, in both cases, concavity holds automatically—no need for the parametric conditions in Proposition 3. Also, at both boundary cases the optimal solution is of newsvendor type. Furthermore, the newsvendor solutions are upper bounds to the optimal solution $(z_1^*, z_2^*)$ that maximizes $G_c$, due to the submodularity of $G_c$ in $(z_1, z_2)$. That is, for $i = 1, 2$, we have $z_i^* \leq z_i^u$), where $z_i^u$ denotes the optimal solution to the newsvendor problems in (31) and (32).

For the down-selling case, the solutions are directly obtained as follows:

$$\partial_1 G_d(z_1, 0) = p_1 - c_1 - p_1 F_+(z_1) = 0 \Rightarrow F_+(z_1) = \frac{p_1 - c_1}{p_1}; \quad (33)$$

and $$\partial_2 G_d(0, z_2) = p_2^d - c_2 - (p_2^d - c_1)F_2(z_2) = 0 \Rightarrow F_2(z_2) = \frac{p_2^d - c_2}{p_2^d - c_1}. \quad (34)$$

Note the optimal solution when $z_2 = 0$ is the same as in the cross-selling case.

For the upselling case, the solutions are directly obtained as follows:

$$\partial_2 G_u(0, z_2) = p_2^u - c_2 - (p_2^u - c_1)F_+(z_2) = 0 \Rightarrow F_+(z_2) = \frac{p_2^u - c_2}{p_2^u - c_1}.$$

Propositions 2 and 3 above illustrates that the solutions of Eq. (19) and Eq. (20) are optimal. The submodularity and concavity properties shown in Propositions 2 and 3 show that setting the first order derivatives in Eq. (31) and Eq. (33) to zero and solving for $z_i$ yields an optimal solution.

It should be understood that while the equations above used product quality indexes 1 to 2, and customer sensitivity indexes 1 to 2, the equations may be extended to include any number of product qualities and customer sensitivities. Therefore, the above equations are used to illustrate an example and general forms of the formulas.

FIG. 1 is a flow diagram illustrating a method for determining joint pricing and inventory control of freshness inventory in one embodiment of the present disclosure. At 102, input information is received. Input information may include historical sales data for a selected product and freshness grade i. For example, freshness grade i=1 might denote the highest grade of freshness (e.g., products that were delivered to a retail store in the current week), freshness grade i=2 might denote the next highest grade of freshness (e.g., products that have been stocked in a retail store for one week), etc. For each freshness grade i and time period t, the historical sales data should include the quantity of product of freshness grade i sold in time period t, $Q_{it}$, and the sale price of the product, $P_{it}$. Additional inputs may include a demand forecast over one or more future time periods for the selected product, aggregated over all freshness grades i.

At 104, a consumer choice model is employed to determine a utility for each freshenss grade i (see, for example, T. Hastie, R. Tibshirani and J. Friedman: The Elements of Statistical Learning: Data Mining, Inference, and Prediction. Second Edition, February 2009, Springer, New York, or S. M. Ross. "Probability and Statistics for Engineers and Scientists." 4th ed, 2009, Academic Press, Burlington, Mass.) In one embodiment, the utility is a linear function of the form $\theta_k v_i - p_i$ where $p_i$ denotes the price of the product; $v_i$ the product quality (or, specifically, a measure of freshness) of the product; and $\theta_k$ a parameter that reflects a customer's sensitivity to the product quality. The index k denotes a customer segment.

At junction 106, the output of step 104 is employed for determining the pricing and inventory strategies jointly for three preferred stock-out substitution policies: cross-selling, down-selling policy and up-selling. Under a cross-selling policy, customers that came to purchase a product of freshness grade i and find the product out of stock always consider a product of freshness grade j as a viable substitute. Under a down-selling policy, customers that came to purchase a product of freshness grade i and find the product out of stock will consider purchasing a product of freshness grade j as a substitute only if j<i, where j denotes a lower freshness grade than i. Similarly, under an up-selling policy, customers that came to purchase a product of freshness grade i and find the product out of stock will consider purchasing a product of freshness grade j as a substitute only if j>i, where j denotes a higher freshness grade than i.

Reference items 108, 110 and 112 describe the method for determining the pricing and inventory strategies under a cross-selling policy. At 108 the optimized retail prices are determined for a period, for example, based on the model's computations given in equation (5b). At 110 the optimized order-up-to levels $z_i^c$ are determined, for example, by employing a gradient search algorithm to find the values that maximize equation (19). At 112 the maximum retailer profit $G_c(z_1^c, z_2^c)$ for the cross-selling policy is determined, for example, from the calculations in equation (19).

Reference items 114, 116 and 118 describe the method for determining the pricing and inventory strategies under a down-selling policy in one embodiment of the present disclosure. At 114, for example, the optimized retail prices $p_i^d$ are determined for a period based on the model's computations given in equation (5c). At 116, the optimized order-up-to levels $z_i^d$ are determined, for example, by employing a gradient search method to find the values that maximize equation (20). At 118, the maximum retailer profit $G_d(z_1^d, z_2^d)$ for the down-selling policy is determined, for example, from the calculations in equation (20).

Reference items 120 to 124 describe the method for determining the pricing and inventory strategies under a cross-selling policy in one embodiment of the present disclosure. At 120, the optimized retail prices $p_i^u$ are determined for a period, for example, based on the model's computations given in equation (5d). At 122 the optimized order-up-to levels $z_i^u$ are determined, for example, by employing a gradient search method to find the values that maximize equation (7b). At 124 the maximum retailer profit $G_u(z_1^u, z_2^u)$ for the down-selling policy is determined, for example, from the calculations in equation (7b).

At 126 the method compares the optimized retailer profit values that were computed for the three preferred stock-out substitution policies.

At 128 the method outputs the joint pricing and replenishment mechanism for freshness inventory that yields the highest optimized retailer profit value in 126.

Figure 2:
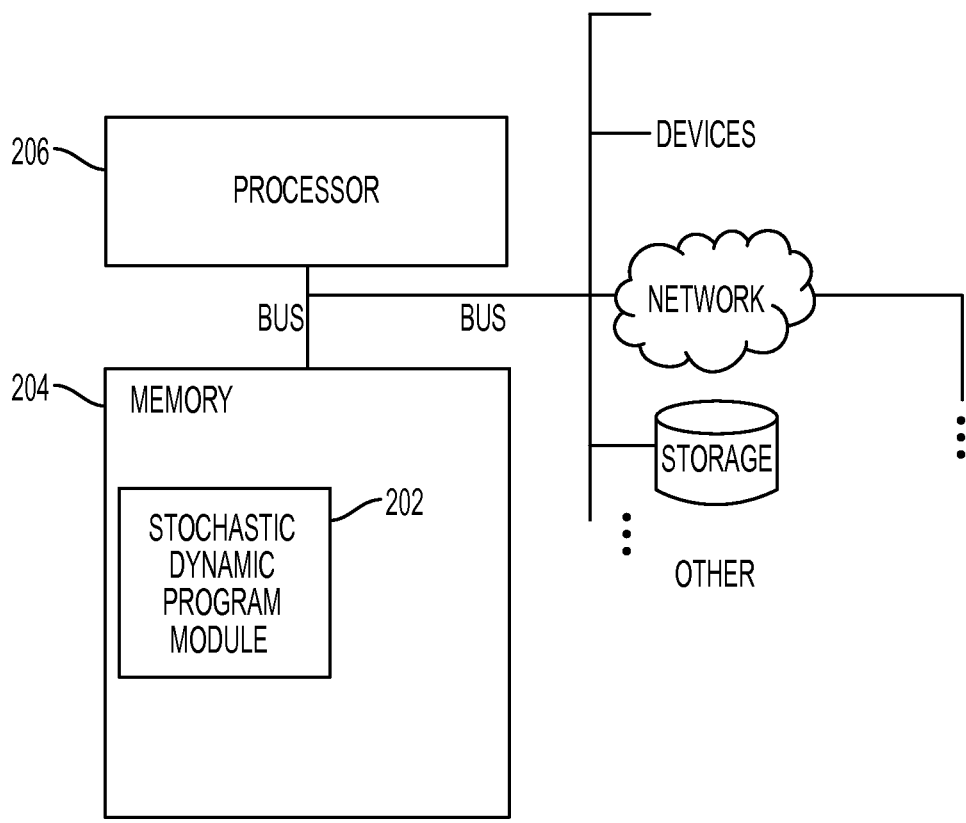
FIG. 2 is a diagram illustrating computer components that may run or implement the methodology of the present disclosure in one embodiment.

FIG. 2 is a diagram illustrating computer components that may run or implement the methodology of the present disclosure in one embodiment. A stochastic dynamic program module 202 may be stored in memory 204 and may include one or more dynamic programming formulations that model joint pricing and replenishment control mechanism as described above. The module 202 may also include programming logic for receiving inputs such as historical sales data for a selected product, associated freshness grade, and a demand forecast over one or more future time periods for the selected product, aggregated over all freshness grades. The module 202 may further include programming logic for computing prices, order-up-to-levels, optimal profit for different selling scenarios such as cross-selling, down-selling and up-selling, and also for suggesting prices and order-up-to levels for most profitable scenario. The program module 202 may execute on, for example, a processor 206, and may utilize the devices such network and storage devices in executing its functionality.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for joint pricing and replenishment of freshness inventory, comprising:
   receiving sales data including sales price and quantities sold associated with a given product;
   determining product qualities and customer's sensitivities to the product qualities for a plurality of customer classes based on the received sales data;
   determining maximum cross-selling retailer price associated with each of the product qualities for a cross-selling scenario;
   determining cross-selling order-up-to levels for the plurality of product qualities based on the determined maximum cross-selling retailer price associated with each of the product qualities and a first objective function;
   computing, by a processor, cross-selling profit based on the determined cross-selling order-up-to levels based on the first objective function;
   determining maximum down-selling retailer price associated with each of the product qualities for a down-selling scenario;
   determining down-selling order-up-to levels for the plurality of product qualities based on the determined maximum down-selling retailer price associated with each of the product qualities and a second objective function;
   computing cross-selling profit based on the determined down-selling order-up-to levels based on the second objective function;
   determining maximum up-selling retailer price associated with each of the product qualities for an up-selling scenario;
   determining up-selling order-up-to levels for the plurality of product qualities based on the determined maximum up-selling retailer price associated with each of the product qualities and a third objective function;
   computing up-selling profit based on the determined up-selling order-up-to levels based on the third objective function;
   selecting a profitable scenario from the cross-selling scenario, the down-selling scenario and the up-selling scenario, based on the computed cross-selling profit, the down-selling profit, and the up-selling profit; and
   outputting prices and order-up-to levels associated with the selected profitable scenario,
   wherein the maximum cross-selling retailer price is determined using a formulation of general form, $(p_1^c, p_2^c) = (\theta_1 v_1, \theta_1 v_2)$, wherein p denotes a price, v denotes quality of the product, and $\theta$ represents the customer's sensitivity to the product quality.

2. The method of claim 1, wherein the first objective function includes a formulation of general form, $(p_1-c_1)z_1 + (p_2^c - c_2)z_2 + p_1(\overline{m}_2 - \overline{M}_2) + (p_2^c - c_1)(\overline{m}_1 - \overline{M}_1)$,
   and the determining cross-selling order-up-to levels for the plurality of product qualities based on the determined maximum cross-selling retailer price associated with each of the product qualities and a first objective function includes the first objective function, wherein
   $p_1$ represents price of product type 1;
   $c_1$ represents cost of product type 1;
   $z_1$ represents order quantity of product type 1;
   $p_2^c$ represents price of product type 2 in cross-selling scenario;
   $c_2$ represents cost of product type 2;
   $z_2$ represents order quantity of product type 2;
   $\overline{m}_i := E(m_i)$ represents expected left over inventory for product i; $\overline{M}_i := E(M_i)$ represents expected total left over inventory for product i.

3. The method of claim 1, wherein the maximum down-selling retailer price is determined using a formulation of general form, $(p_1^d, p_2^d) = (\theta_1 v_1, \theta_2(v_2 - v_1) + \theta_1 v_1)$, wherein p denotes a price, v denotes quality of the product, and $\theta$ represents the customer's sensitivity to the product quality.

4. The method of claim 1, wherein the second objective function includes a formulation of general form, $(p_1 - c_1)z_1 + (p_2^d - c_2)z_2 + p_1(\overline{m}_2 - \overline{M}_2) - (p_2^d - c_1)\overline{m}_2$,
   and the determining down-selling order-up-to levels for the plurality of product qualities based on the determined maximum down-selling retailer price associated with each of the product qualities and a second objective function includes maximizing the second objective function, wherein
   $p_1$ represents price of product type 1;
   $c_1$ represents cost of product type 1;
   $z_1$ represents order quantity of product type 1;
   $p_2^d$ represents price of product type 2 in down-selling scenario;
   $c_2$ represents cost of product type 2;
   $z_2$ represents order quantity of product type 2;
   $\overline{m}_i := E(m_i)$ represents expected left over inventory for product i; $\overline{M}_i := E(M_i)$ represents expected total left over inventory for product i.

5. The method of claim 1, wherein the maximum up-selling retailer price is determined using a formulation of general form, $(p_1^u, p_2^u) = (\theta_1 v_2, \theta_1 v_2)$, wherein p denotes a price, v denotes quality of the product, and $\theta$ represents the customer's sensitivity to the product quality.

6. The method of claim 1, wherein the third objective function includes a formulation of general form, $G_u(0, z_2) := [p_2^u E(z_2 \wedge (D_1 + D_2)) - c_2 z_2] + c_1 E[z_2 - (D_1 + D_2)]^+$, and the determining up-selling order-up-to levels includes maximizing the third objective function, wherein
   $G_u$ represents an objective function for up-selling;
   $z_2$ represents order quantity of product type 2;
   $p_2^u$ represents price of product type 2 in up-selling scenario;
   E denotes expected value;
   $D_1$ represents demand for product type 1;
   $D_2$ represents demand for product type 2;
   $c_2$ represents cost of product type 2; and
   $c_1$ represents cost of product type 1.

7. The method of claim 1, wherein the steps are repeated for a plurality of periods.

8. A method for joint pricing and replenishment of freshness inventory, comprising:
   receiving sales data including sales price and quantities sold associated with a given product;

determining product qualities and customer's sensitivities to the product qualities for a plurality of customer classes based on the received sales data;

for each of a plurality of selling scenarios:

determining maximum retailer price associated with each of the product qualities;

determining order-up-to levels for the plurality of product qualities based on the determined maximum retailer price associated with each of the product qualities and an objective function; and computing, by a processor, a profit based on the determined order-up-to levels and the objective function;

selecting a profitable selling scenario from the plurality of selling scenarios based on the computed profit associated with said each of the plurality of selling scenarios; and identifying prices and order-up-to levels associated with the selected profitable selling scenario, wherein the plurality of selling scenarios comprises a cross-selling scenario, a down-selling scenario, and an up-selling scenario, wherein in the cross-selling scenario, the objective function has a general form of $(p_1-c_1)z_1+)p_2^c-c_2)z_2+p_1(\overline{m}_2-\overline{M}_2)+(p_2^c-c_1)(\overline{m}_1-\overline{M}_1)$, which is maximized to determine the order-up-to levels, wherein $p_1$ represents price of product type 1;

$c_1$ represents cost of product type 1;

$z_1$ represents order quantity of product type 1;

$p_2^c$ represents price of product type 2 in cross-selling scenario;

$c_2$ represents cost of product type 2;

$z_2$ represents order quantity of product type 2;

$\overline{m}_i:=E(m_i)$ represents expected left over inventory for product i; $\overline{M}_i:=E(M_i)$ represents expected total left over inventory for product i.

9. The method of claim 8, wherein in the down-selling scenario, the objective function has a general form of $(p_1-c_1)z_1+(p_2^d-c_2)z_2+p_1(\overline{m}_2-\overline{M}_2)-(p_2^d-c_1)\overline{m}_2$, which is maximized to determine the order-up-to levels, wherein $p_1$ represents price of product type 1;

$c_1$ represents cost of product type 1;

$z_1$ represents order quantity of product type 1;

$p_2^d$ represents price of product type 2 in down-selling scenario;

$c_2$ represents cost of product type 2;

$z_2$ represents order quantity of product type 2;

$\overline{m}_i:=E(m_i)$ represents expected left over inventory for product i; $\overline{M}_i:=E(M_i)$ represents expected total left over inventory for product i.

10. The method of claim 8, wherein in the up-selling scenario, the objective function has a general form of $G_u(0,z_2):=[p_2^u E(z_2 \wedge (D_1+D_2))-c_2z_2]+c_1E[z_2-(D_1+D_2)]^+$, which is maximized to determine the order-up-to levels, wherein $G_u$ represents an objective function for up-selling;

$z_2$ represents order quantity of product type 2;

$p_2^u$ represents price of product type 2 in up-selling scenario;

E denotes expected value;

$D_1$ represents demand for product type 1;

$D_2$ represents demand for product type 2;

$c_2$ represents cost of product type 2;

$c_1$ represents cost of product type 1.

11. The method of claim 9, wherein the steps are repeated for a plurality of periods.

12. A non-transitory computer readable storage medium storing a program of instructions executable by a machine to perform a method of joint pricing and replenishment of freshness inventory, the method comprising:

receiving sales data including sales price and quantities sold associated with a given product;

determining product qualities and customer's sensitivities to the product qualities for a plurality of customer classes based on the received sales data;

for each of a plurality of selling scenarios:

determining maximum retailer price associated with each of the product qualities;

determining order-up-to levels for the plurality of product qualities based on the determined maximum retailer price associated with each of the product qualities and an objective function;

computing, by a processor, a profit based on the determined order-up-to levels and the objective function;

selecting a profitable selling scenario from the plurality of selling scenarios based on the computed profit associated with said each of the plurality of selling scenarios; and identifying prices and order-up-to levels associated with the selected profitable selling scenario, wherein the plurality of selling scenarios comprises a cross-selling scenario, a down-selling scenario, and an up-selling scenario, wherein in the cross-selling scenario, the objective function has a general form of $(p_1-c_1)z_1+(p_2^c-c_2)z_2+p_1(\overline{m}_2-\overline{M}_2)+(p_2^c-c_1)(\overline{m}_1-\overline{M}_1)$, which is maximized to determine the order-up-to levels, wherein $p_1$ represents price of product type 1;

$c_1$ represents cost of product type 1;

$z_1$ represents order quantity of product type 1;

$p_2^c$ represents price of product type 2 in cross-selling scenario;

$c_2$ represents cost of product type 2;

$z_2$ represents order quantity of product type 2;

$\overline{m}_i:=E(m_i)$ represents expected left over inventory for product i; $\overline{M}_i:=E(M_i)$ represents expected total left over inventory for product i.

13. The computer readable storage medium of claim 12, wherein in the down-selling scenario, the objective function has a general form of $(p_1-c_1)z_1+(p_2^d-c_2)z_2+p_1(\overline{m}_2-\overline{M}_2)-(p_2^d-c_1)\overline{m}_2$, which is maximized to determine the order-up-to levels, wherein $p_1$ represents price of product type 1;

$c_i$ represents cost of product type 1;

$z_1$ represents order quantity of product type 1;

$p_2^d$ represents price of product type 2 in down-selling scenario;

$c_2$ represents cost of product type 2;

$z_2$ represents order quantity of product type 2;

$\overline{m}_i:=E(m_i)$ represents expected left over inventory for product i; $\overline{M}_i:=E(M_i)$ represents expected total left over inventory for product i.

14. The computer readable storage medium of claim 12, wherein in the up-selling scenario, the objective function has a general form of $G_u(0,z_2):=[p_2^u E(z_2 \wedge (D_1+D_2))-c_2z_2]c_1E[z_2-(D_1+D_2)]^+$, which is maximized to determine the order-up-to levels, wherein $G_u$ represents an objective function for up-selling;

$z_2$ represents order quantity of product type 2;

$p_2^u$ represents price of product type 2 in up-selling scenario;

E denotes expected value;

$D_1$ represents demand for product type 1;

$D_2$ represents demand for product type 2;

$c_2$ represents cost of product type 2;
$c_1$ represents cost of product type 1.

15. The computer readable storage medium of claim 12, wherein the steps are repeated for a plurality of periods.

16. A system for joint pricing and replenishment of freshness inventory, comprising
a processor;
a module operable to execute on the processor and further operable to receive sales data including sales price and quantities sold associated with a given product,
the module further operable to determine product qualities and customer's sensitivities to the product qualities for a plurality of customer classes based on the received sales data,
the module further operable to determine maximum cross-selling retailer price associated with each of the product qualities for a cross-selling scenario,
the module further operable to determine cross-selling order-up-to levels for the plurality of product qualities based on the determined maximum cross-selling retailer price associated with each of the product qualities and a first objective function,
the module further operable to compute cross-selling profit based on the determined cross-selling order-up-to levels based on the first objective function,
the module further operable to determine maximum down-selling retailer price associated with each of the product qualities for a down-selling scenario,
the module further operable to determine down-selling order-up-to levels for the plurality of product qualities based on the determined maximum down-selling retailer price associated with each of the product qualities and a second objective function,
the module further operable to compute cross-selling profit based on the determined down-selling order-up-to levels based on the second objective function,
the module further operable to determine maximum up-selling retailer price associated with each of the product qualities for an up-selling scenario,
the module further operable to determine up-selling order-up-to levels for the plurality of product qualities based on the determined maximum up-selling retailer price associated with each of the product qualities and a third objective function,
the module further operable to compute up-selling profit based on the determined up-selling order-up-to levels based on the third objective function,
the module further operable to select a profitable scenario from the cross-selling scenario, the down-selling scenario and the up-selling scenario, based on the computed cross-selling profit, the down-selling profit, and the up-selling profit,
the module further operable to output prices and order-up-to levels associated with the selected profitable scenario
wherein the first objective function includes a formulation of general form, $(p_1-c_1)z_1+(p_2^c-c_2)z_2+p_1(\overline{m}_2-\overline{M}_2)+(p_2^c-c_1)(\overline{m}_1-\overline{M}_1)$, which is maximized to determine the cross-selling order-up-to levels, wherein
$p_1$ represents price of product type 1;
$c_1$ represents cost of product type 1;
$z_1$ represents order quantity of product type 1;
$p_2^c$ represents price of product type 2 in cross-selling scenario;
$c_2$ represents cost of product type 2;
$z_2$ represents order quantity of product type 2;
$\overline{m}_i:=E(m_i)$ represents expected left over inventory for product $i$; $\overline{M}_i:=E(M_i)$ represents expected total left over inventory for product $i$.

17. The system of claim 16, wherein the second objective function includes a formulation of general form, $(p_1-c_1)z_1+(p_2^d-c_2)z_2+p_1(\overline{m}_2-\overline{M}_2)-(p_2^d-c_1)\overline{m}_2$, which is maximized to determine the down-selling order-up-to levels, wherein
$p_1$ represents price of product type 1;
$c_1$ represents cost of product type 1;
$z_1$ represents order quantity of product type 1;
$p_2^d$ represents price of product type 2 in down-selling scenario;
$c_2$ represents cost of product type 2;
$z_2$ represents order quantity of product type 2;
$\overline{m}_i:=E(m_i)$ represents expected left over inventory for product $i$; $\overline{M}_i:=E(M_i)$ represents expected total left over inventory for product $i$.

18. The system of claim 16, wherein the third objective function includes a formulation of general form, $G_u(0,z_2):=[p_2^u E(z_2 \wedge (D_1+D_2))-c_2 z_2]+c_1 E[z_2-(D_1+D_2)]^+$, which is maximized to determine the up-selling order-up-to levels, wherein
$G_u$ represents an objective function for up-selling;
$z_2$ represents order quantity of product type 2;
$p_2^u$ represents price of product type 2 in up-selling scenario;
E denotes expected value;
$D_1$ represents demand for product type 1;
$D_2$ represents demand for product type 2;
$c_2$ represents cost of product type 2;
$c_1$ represents cost of product type 1.

* * * * *